United States Patent [19]
Hershey et al.

[11] Patent Number: 6,101,214
[45] Date of Patent: Aug. 8, 2000

[54] POWER LINE COMMUNICATIONS SPREAD SPECTRUM SYMBOL TIMING AND RANDOM PHASING

[75] Inventors: John Erik Hershey, Ballston Lake; Gary Jude Saulnier, Rexford; Richard August Korkosz, Rotterdam Junction; Kenneth Brakeley Welles, II, Scotia; Richard Charles Gaus, Jr., Burnt Hills, all of N.Y.

[73] Assignee: General Electric Company, Schenectady, N.Y.

[21] Appl. No.: 08/845,867

[22] Filed: Apr. 28, 1997

[51] Int. Cl.$^7$ .............................. H04B 15/00; H04K 1/00; H04L 27/30; H04M 11/04
[52] U.S. Cl. .................... 375/200; 375/201; 375/202; 375/346; 375/296; 375/259; 379/106.03; 340/310.02; 340/310.03; 340/870.02
[58] Field of Search ............................ 375/200, 201, 375/202, 203, 346, 259, 296, 295, 316; 379/106.03, 106.05, 106.11, 106.07; 340/310.02, 310.03, 310.01, 870.02, 870.06, 870.03, 870.11

[56] References Cited

U.S. PATENT DOCUMENTS

| | | | |
|---|---|---|---|
| 5,404,127 | 4/1995 | Lee et al. | 340/310.02 |
| 5,519,692 | 5/1996 | Hershey et al. | 370/210 |
| 5,519,725 | 5/1996 | Hershey et al. | 375/216 |
| 5,581,229 | 12/1996 | Hunt | 340/310.02 |
| 5,844,949 | 12/1998 | Hershey et al. | 375/346 |
| 5,903,594 | 5/1999 | Saulnier et al. | 375/200 |

*Primary Examiner*—Stephen Chin
*Assistant Examiner*—Michael W. Maddox
*Attorney, Agent, or Firm*—Marvin Snyder; Douglas E. Stoner

[57] ABSTRACT

A system for spread spectrum power line communications employs a harmonic modulation (HM) transmitter coupled to the power line for transmitting message bits to an HM receiver. The spread spectrum accommodates a plurality of HM transmitters simultaneously occupying the same bandwidth. The spectrum of HM, in a frequency range above 60 Hz but below the maximum frequency that will carry through a distribution transformer, is ideal in combating carrier synchronous noise since it can be interleaved with the noise harmonics and therefore be effectively spectrally disjoint with the synchronous noise process spectrum.

4 Claims, 4 Drawing Sheets

POWER LINE COMMUNICATIONS SPREAD SPECTRUM SYMBOL TIMING AND RANDOM PHASING

CROSS-REFERENCE TO RELATED APPLICATION

This application is related in subject matter to application Ser. No. 08/728,020 filed Oct. 9, 1996, now U.S. Pat. No. 5,844,149, filed by Hershey et al. for "Power Line Communication System" and assigned to the assignee of this application. The subject matter of that application is incorporated herein by reference.

BACKGROUND OF THE INVENTION

1. Field of the Invention

This invention generally relates to electronic signal modulation and, more particularly, to spread spectrum symbol timing in Harmonic Modulation (HM) power line communications (PLC).

2. Background Description

Electric power companies typically have a service person visit customers and read a power meter to determine the amount of power consumed for billing purposes. This can be cumbersome and time consuming when there are many customers, especially if they are dispersed over a large geographic area.

It would be beneficial for power companies to read these electric power meters remotely. The power wires connected to each customer's power meter constitute a possible path for communicating with the power meters; however, existing modulation techniques may not be easily implemented or reliably perform in the high-noise environment of a power line. Moreover, transformers employed in the power line network are inherently inductively coupled and consequently introduce non-linear phase shifts in signals passing through the transformer. Therefore, complex communications systems are required to perform reliably in the high-noise, phase distorted power line channels. For example, some of these systems monitor several frequency channels, select an appropriate channel, and then indicate the appropriate frequency to other communicating units. Other systems, such as that set forth in U.S. Pat. No. 5,185,591 to Shuey, issued Feb. 9, 1993, employ a plurality of signals which are not harmonically related, so as to require elaborate filtering and signal extraction.

Currently, there is need for a relatively simple communication system which can utilize existing power lines to remotely read multiple power meters simultaneously.

SUMMARY OF THE INVENTION

Geometric Harmonic Modulation (GHM) has been proposed for power line communication because its spectrum is ideal in combating carrier synchronous noise. The GHM spectrum can be laid interstitially with the noise harmonics and therefore be effectively spectrally disjoint with the synchronous noise process spectrum. Harmonic Modulation (HM), which grew out of GHM, is used as a true spread spectrum modulation consisting of a plurality of modulated tones spaced in frequency, with equal distance between adjacent tones. The spread spectrum accommodates a plurality of transmitters simultaneously occupying the same bandwidth.

According to a preferred embodiment of the invention, a system for spread spectrum power line communications comprises a harmonic modulation transmitter for transmitting message bits on a power line by synthesizing a waveform having M tones, modulating the M tones with data, and interstitially inserting the M tones in a synchronous noise spectrum on the power line. The transmitter includes a carrier wave synthesis device for creating a carrier wave having M frequency lobes between interference lobes, and a first timing controller to determine bit periods. The timing controller is synchronized with power line voltage and includes means for estimating a phase of the synchronous signal and comparing the estimated phase to an externally supplied phase offset to generate a timing signal. The transmitter further includes a bit encoder coupled to the timing controller and the synthesis device which inverts the carrier waveform for a single bit period for one bit value of the message bit and leaves the carrier wave unchanged for a second message bit value to create an encoded message. A summation device included in the transmitter is coupled to the bit encoder for summing the encoded message with existing signals on the power line. The system for spread spectrum power line communications further includes a harmonic modulation receiver coupled to the power line for receiving a message transmitted by the transmitter in the form of the modulated M tones and having a second timing controller coupled to the power line to derive timing signals for a received message and including means for detecting zero crossings of a power line waveform and generating a resynchronization signal for periodically resynchronizing a sampling clock. The receiver further includes a sampler responsive to the timing controller which converts a continuous time signal into a series of discrete time samples, a quantizer responsive to the timing controller and coupled to the sampler, a Fourier transform device which performs a Fourier transform on the samples to obtain Fourier coefficients, and a decoder responsive to the Fourier coefficients for recovering the message bits transmitted by the transmitter.

DETAILED DESCRIPTION OF A PREFERRED EMBODIMENT OF THE INVENTION

Basic GHM

Figure 1:
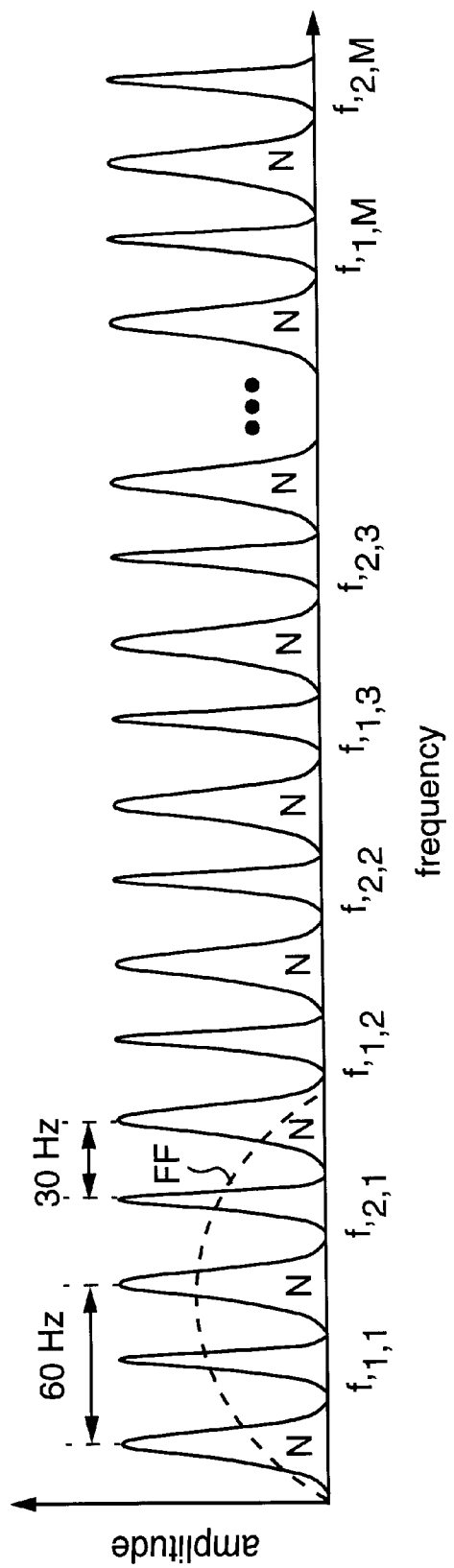
FIG. 1 is a graph of a Harmonic Modulation (HM) signaling power spectrum interleaved with power line interference.

Geometric Harmonic Modulation (GHM) for communications systems has been described for radiowave communication in Hershey et al. U.S. Pat. No. 5,519,725 issued May 21, 1996, assigned to the instant assignee, and which is incorporated herein by reference. GHM allocates signaling energy into lobes, or tones, at different frequencies evenly spaced at geometrically increasing multiples of a base frequency. The GHM signaling waveforms $\{W_n(\Phi,R;t)\}$ are true spread spectrum signals in that the signal bandwidth, i.e., the bandwidth from the lowest frequency tone to the highest, vastly exceeds the information bandwidth conveyed by the GHM transmission.

Binary GHM signals convey binary data by inverting or not inverting the GHM waveform {W$_n$(Φ,R;t)} during a bit duration interval.

It is not necessary for the GHM transmitter and the GHM receiver to "agree" on the best frequency on which to send data, as the same data is sent on each of the GHM tones which are spread through the 5–10 kHz band. Thus the operation or signaling protocol of the GHM system is less complex than a single tone system in which the transmitter and receiver must jointly search for, and agree upon, a frequency which is not attenuated by a fading phenomenon such as standing waves, for example.

It was found that by modifying the GHM signaling waveform {W$_n$(Φ,R;t)}, the waveform can have spectral properties well suited to the synchronous noise environment encountered on much of the power line network.

A more general look at GHM and power line noise reveals that lobes of the modulated signal on a frequency spectrum should be interleaved with the power line noise. Since power line noise has a great deal of interference at the basic oscillation frequency and at overtones thereof, the signal should not reside on these frequency regions. By modulating the signal to reside between the interference lobes, the signal will be defined by:

$$s_i(t) = \sum_{k=1}^{M} \{\alpha_{ik}\sin(2\pi f_{ik}t + \phi_{ik}) + \beta_{ik}\cos(2\pi f_{ik}t + \theta_{ik})\} \quad (1)$$

where M is the number of lobes of the signal s$_i$(t), i indicates one of a plurality of different signals which may be transmitted simultaneously, f$_{ik}$ represents a selected frequency, t represents time, and α$_{ik}$ and β$_{ik}$ represent fixed amplitude coefficients for the i-th waveform. The phases φ$_{ik}$, θ$_{ik}$ of equation (1) may be assigned specific values for each signaling set or, in the most general form of equation (1), may take on random values for any desired signaling set. A particular choice of phases, along with amplitudes and frequencies, determines a unique signaling set that may be used for a particular power line communication application depending upon considerations of information capacity, number of users, number of lines coupling responses, and communication channel characteristics. By selecting frequencies f$_{ik}$ correctly, signals s$_i$ may be interleaved with harmonic power line noise and will be referenced as Harmonic Modulation (HM).

In FIG. 1, a frequency versus amplitude spectrum graph shows harmonic power line noise lobes, marked "N" at the basic frequency (60 Hz), and integer multiples of the basic frequency. An HM signal s$_1$ to be sent has frequency components f$_{11}$, f$_{12}$, . . . , f$_{1M}$. Similarly, an HM signal S$_2$ to be sent has components f$_{21}$, f$_{22}$, . . . , f$_{2M}$. Again each frequency component of signal i carries the same information.

A dotted trace FF depicts an example of frequency-selective fading. This example shows that the first frequency lobes of signals s$_1$ and s$_2$, being f$_{11}$ and f$_{21}$, respectively, will be attenuated, while other frequencies will be unaffected.

Modifying GHM Frequencies

The HM signal of FIG. 1 has no appreciable frequency content at 60 Hz and its harmonics. Thus, such a modified GHM signal may be received over a power line communication link without much interference from the 60 Hz synchronous signal.

The parameter M represents the number of local maxima ("main lobes") of the power spectral density, and the signaling rate controls the spectral density and spectral width of the main lobes. For a meter reading or other power line communications application, a larger value of M may be used for greater spectrum spreading.

The spectrum of the modified HM signaling waveform must be in a frequency range sufficiently above the 60 Hz fundamental frequency to avoid interference with that frequency, and still carry through a distribution transformer. The modulation of the HM waveform must not be significantly affected or corrupted by non-linear phase shifts which occur as a signal passes through an inductively coupled transformer.

Transmitter Implementation

Figure 2:
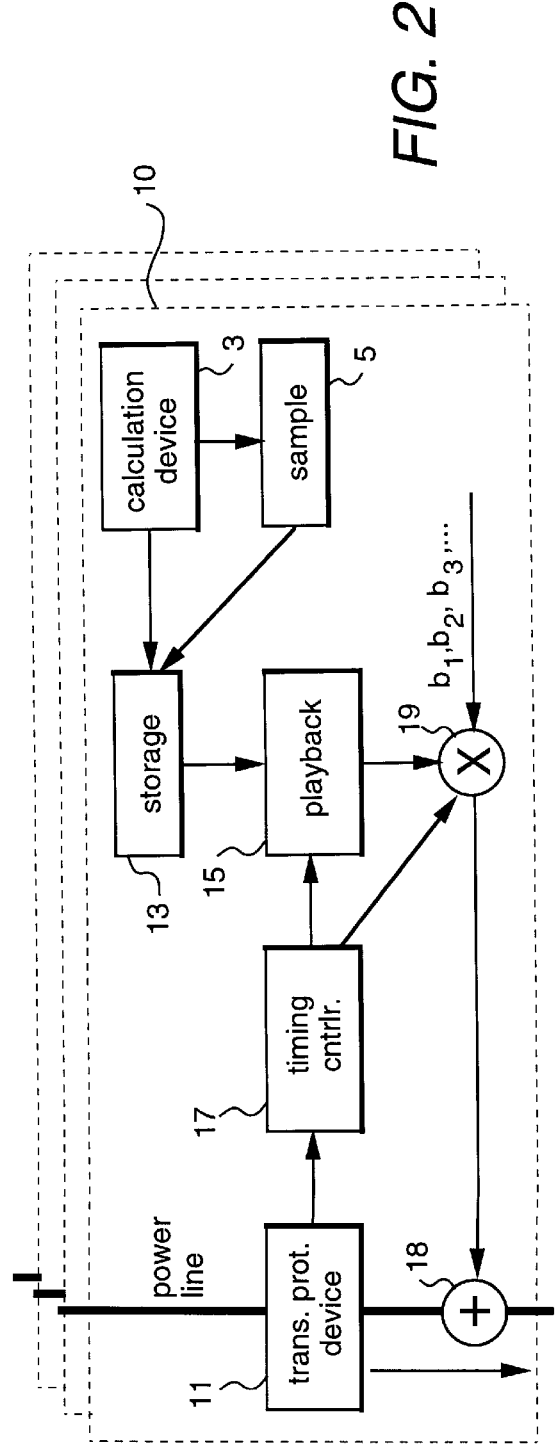
FIG. 2 is a simplified block diagram of a power line communication transmitter employing harmonic modulation (HM) for spread spectrum power line communications according to the invention.

FIG. 2 is a simplified block diagram of a transmitter 10 coupled to a power line, and represents one of many transmitters which may be coupled to the same power line. A given number of tones M to be transmitted is selected. Signals according to equation (1) are then synthesized by a calculation device 3, which may be a general purpose computer (i.e., microprocessor) or a device which creates a continuous carrier waveform (e.g., digital signal processor). The output signal of calculation device 3 is sampled by a sampler 5. The samples are saved in a storage device 13 which, in its preferred embodiment, is a non-volatile memory such as an electronically erasable and programmable read only memory (E$^2$PROM). The selection, synthesizing, sampling and storage operations may all be performed prior to transmission, and need not be performed before each use of transmitter 10.

Preferably, a transient protection device 11, which limits power surges in order to protect equipment down line, is coupled to the power line and passes the signal to a timing controller 17. Timing controller 17, alternatives of which are shown in more detail in FIGS. 4 and 5, determines master timing information from the fundamental power line frequency. A playback device 15, controlled by timing controller 17 and coupled to storage device 13, reads out the samples at a rate synchronous with the power line voltage.

A multiplier 19, also coupled to timing controller 17, multiples the waveform created by playback device 15 by a single bit during each single bit period. The bit sequence is modified prior to transmission by changing bit values to a series of ones and negative ones, instead of ones and zeros. Therefore, when the waveform and signal bits are provided to multiplier 19, a bit value of one will not change the waveform for a bit period, while a bit value of negative one will invert the waveform. The result is an encoded or HM modulated signal which is summed with the power line signal at a summer 18 and communicated over the power line to a receiver.

Receiver Implementation

Figure 3:
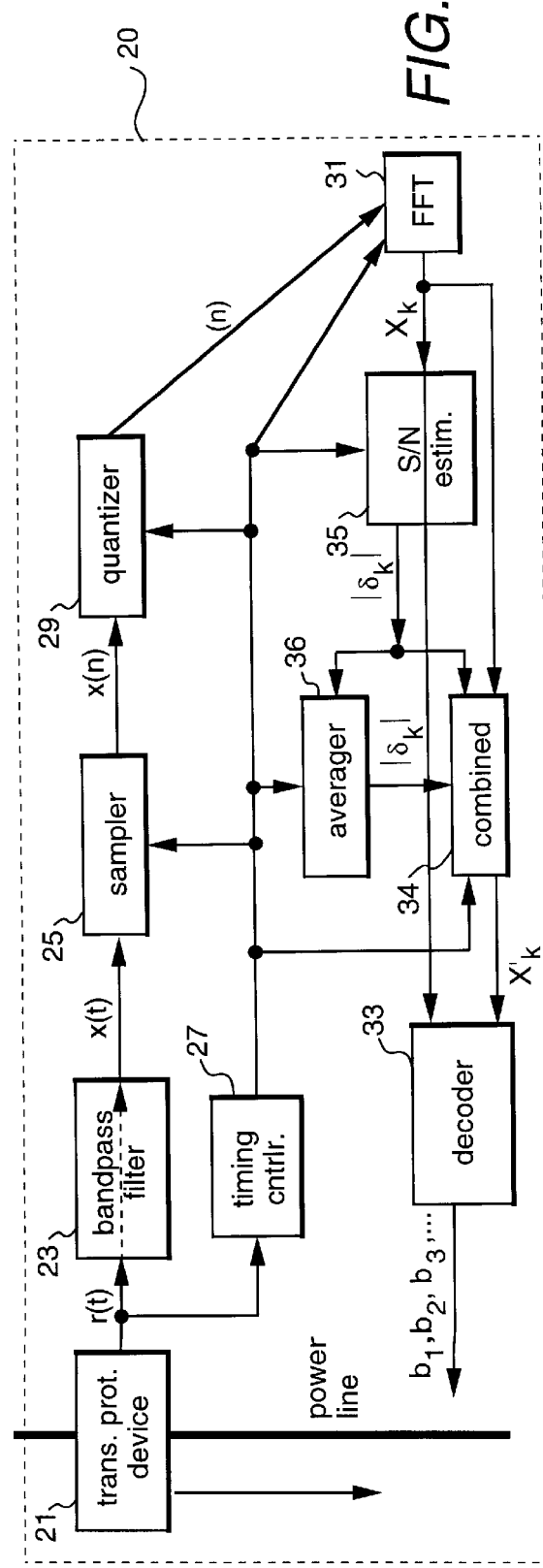
FIG. 3 is a simplified block diagram of a power line communication receiver for decoding HM spread spectrum signaling according to the invention.

FIG. 3 illustrates a simplified HM receiver 20 according to the invention. Again, several receivers may be coupled to the same power line. Receiver 20 is coupled to the power line through a transient protection device 21 which limits power surges, protecting equipment downline. Transient protection device 21 is coupled to a timing controller 27 and a sampler 25. Timing controller 27, alternatives of which are shown in more detail in FIGS. 4 and 5, monitors the power line signal r(t) passed from transient protection device 21 to determine fundamental power line frequency and provides a timing signal to other elements of receiver 20.

Sampler 25, clocked by timing controller 27, samples a continuous signal x(t) provided from transient protection device 21 to produce a series of discrete time samples {x(n)}. Optionally, a bandpass filter 23 is coupled between transient protection device 21 and sampler 25 which removes noise outside the useful spectrum of the HM signaling. The discrete time samples, {x(n)} are provided to a quantizer 29 which reduces the precision of the samples to a set of $2^B$ values, where B is the number of bits allocated per sample.

The quantized samples, {(n)}, are passed to a Fast Fourier Transform (FFT) module 31 which determines the Fourier transform coefficients {$X_k(t)$} for signal {(n)}. In one embodiment, the Fourier transform coefficients from FFT module 31 may be passed directly to a decoder 33, which recovers the message bits from the HM signal.

Optionally, a signal-to-noise (S/N) estimator 35 receives the Fourier coefficients from FFT 31 and determines an estimated signal-to-noise ratio for each Fourier coefficient. A combiner circuit 34 coupled between FFT module 31 and decoder 33 receives the S/N estimate and Fourier coefficients and provides weighting to the coefficients based upon the S/N estimate for that frequency band. This may be any conventional weighting technique, and may be as simple as eliminating coefficients which do not meet a predetermined threshold.

Because the data rate at which the automatic meter reading communications take place is so low, a significant amount of post processing is possible. A better estimate of the S/N ratio therefore may be made by averaging over a predetermined number of symbols in a particular message. Accordingly, in an optional embodiment, an averager 36 may be coupled between S/N estimator unit 35 and combiner 34 to provide this averaging capability.

Timing Controllers

Figure 4:
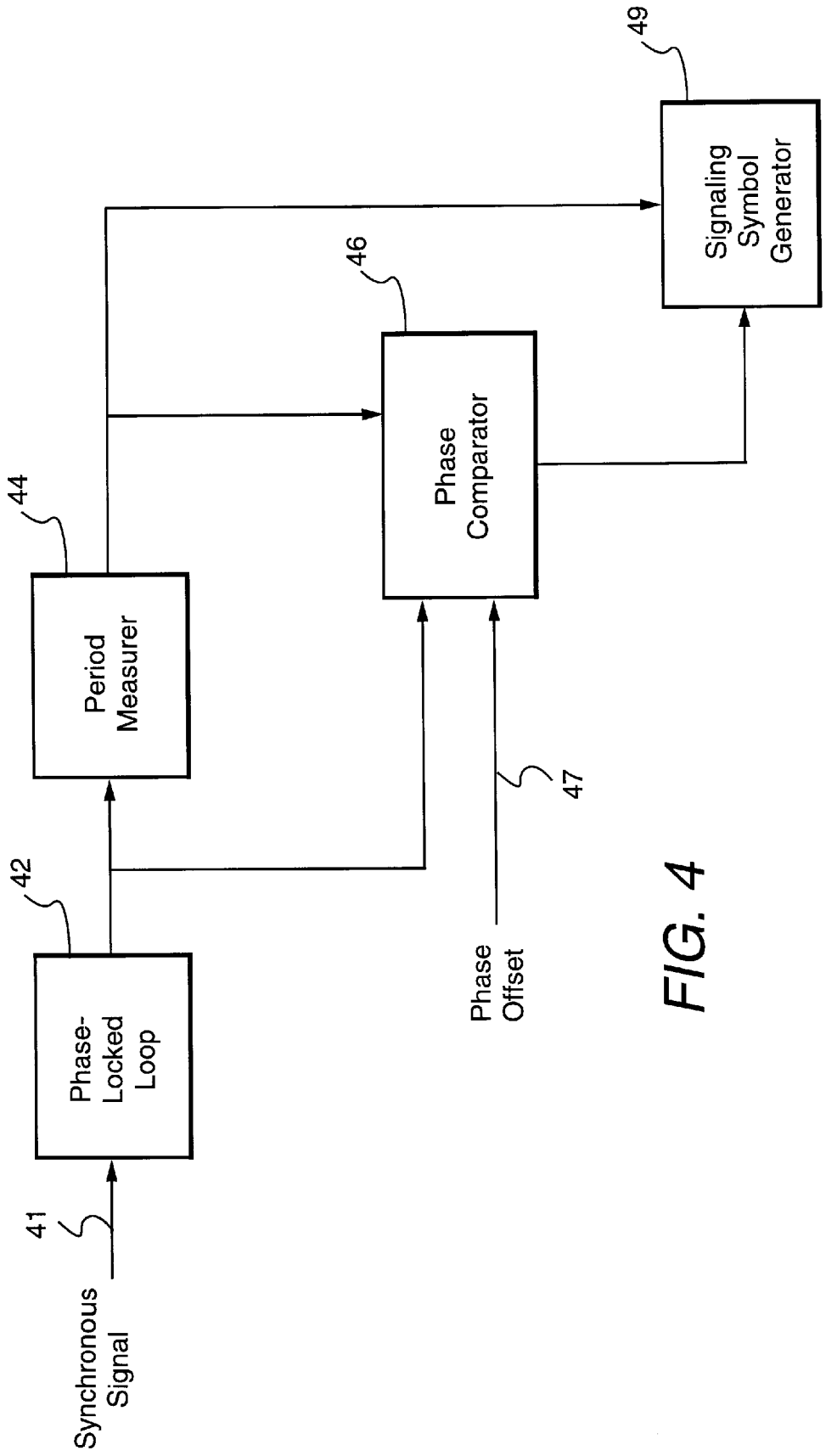
FIG. 4 is a block diagram of a clock derivation and phase offset apparatus for the transmitter and receiver shown in FIGS. 2 and 3, respectively.
Figure 5:
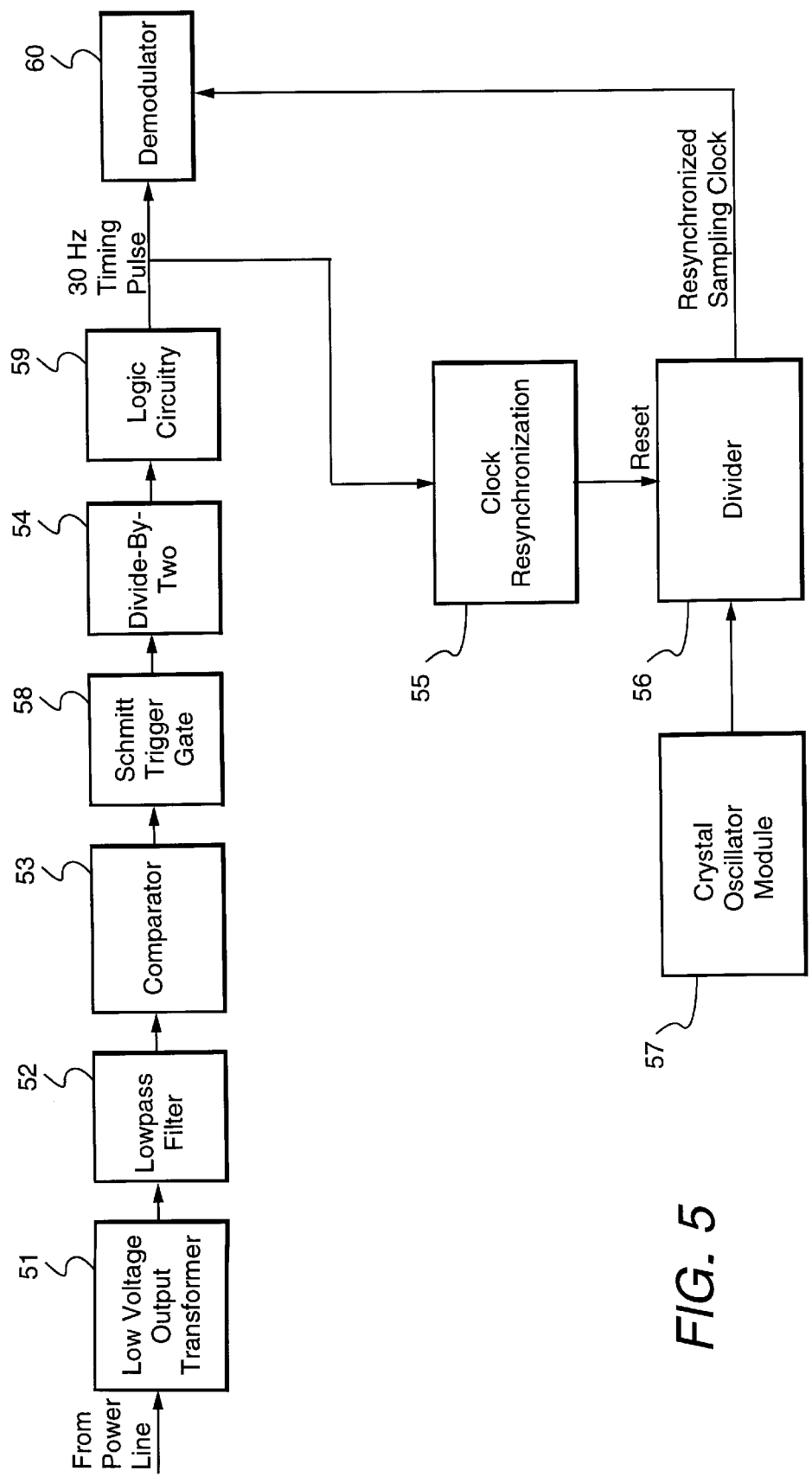
FIG. 5 is a block diagram of an alternate clock derivation and phase offset apparatus for the transmitter and receiver shown in FIGS. 2 and 3, respectively.

FIGS. 4 and 5 illustrate alternative timing controllers which may be used for the transmitter timing controller 17 of FIG. 2 and the receiver timing controller 27 of FIG. 3. As shown in the timing controller of FIG. 4, a synchronous signal 41, which may be either the power line voltage or the outbound HM signal, is supplied to a Phase Locked Loop (PLL) 42. PLL 42 has a narrowband loop filter and produces a sine wave which is in phase with, and at the same frequency (averaged over short term fluctuations) as, the input synchronous signal 41.

The output sine wave of PLL 42 is provided to a period measurer 44 which estimates the period of the output sine wave. This can be done, for example, by counting the number of pulses from a high speed clock between positive-going zero crossings of the PLL output sine wave. The output signal of period measurer 44 is supplied to both a phase comparator 46 and a signaling symbol generator 49. Phase comparator 46 receives three separate input signals: the estimate of the period of the synchronous signal from period measurer 44, the sine wave output signal of phase locked loop 42, and an externally supplied phase offset signal 47. The phase comparator thus estimates the phase of synchronous signal 41 and compares the estimated phase to that of the externally supplied phase offset signal 47. When these two phase measurements agree, phase comparator 46 sends a "start" signal to signaling symbol generator 49 which, in turn, generates an HM symbol of duration equal to the period of synchronous signal 41 and starting at the specified phase offset 47.

In the timing controller shown in FIG. 5, a low voltage (e.g., 9 volts) output transformer 51 is coupled to the 120 volt, 60 Hz power line. The low output voltage of the transformer is low pass filtered in a filter 52 to a cutoff frequency of 60 Hz to 90 Hz to remove all noise and harmonics above the cutoff frequency. The output voltage of lowpass filter 52 is supplied to a comparator 53 which detects the zero crossings of the filtered 60 Hz waveform. The comparator output voltage is applied to switching means such as a fast Schmitt trigger logic gate 58 to further discriminate against spurious noise and to provide a fast transition for a divide-by-two logic divider 54 which divides the 60 Hz square wave from Schmitt trigger logic gate 58 to produce a 30 Hz square wave. The 30 Hz square wave is supplied to additional logic circuitry 59 to produce narrow timing pulses at a 30 Hz rate. The 30 Hz timing pulses, which are much narrower than the 30 Hz square wave pulses, are used by an HM modem demodulator 60.

The narrow 30 Hz timing pulses are also supplied to clock resynchronization logic 55 so that each active timing pulse resets a divider 56 that is being clocked by an asynchronous crystal oscillator 57. Divider 56 produces a resynchronized sampling clock for the HM modem by dividing down from asynchronous crystal oscillator 57 to the sampling frequency required for HM modem modulation and demodulation, using digital counters.

While only certain preferred features of the invention have been illustrated and described, many modifications and changes will occur to those skilled in the art. It is, therefore, to be understood that the appended claims are intended to cover all such modifications and changes as fall within the true spirit of the invention.

We claim:

1. A system for spread spectrum power line communications comprising:

a harmonic modulation transmitter for transmitting message bits on a power line exhibiting a synchronous noise spectrum, said transmitter being adapted to: synthesize a predetermined waveform having M tones, modulate the M tones with data by the transmitter, and interstitially insert the M tones in the power line synchronous noise spectrum, said transmitter having:

carrier wave synthesis means for creating a carrier wave having M frequency lobes between interference lobes, a first timing controller to determine bit periods, said timing controller being synchronized with a power line voltage and including means for estimating a phase of the synchronous noise spectrum and comparing the estimated phase to an externally-supplied phase offset to generate a timing signal, bit encoder means coupled to the timing controller and the carrier wave synthesis means which inverts the carrier waveform for a single bit period for one bit value of said message bit and leaves the carrier wave unchanged for a second message bit value to create an encoded message, and a summation device coupled to the bit encoder for summing the encoded message with existing signals on the power line; and a harmonic modulation receiver coupled to the power line for receiving a message transmitted by the transmitter in the form of the modulated M tones and having:

a second timing controller coupled to the power line to derive timing signals for a received message and including means for detecting zero crossings of a power line waveform and generating a resynchronization signal for periodically resynchronizing a sampling clock, a sampler responsive to the timing controller which converts a continuous time signal into a series of discrete time samples, a quantizer responsive to the timing controller and coupled to the sampler, a Fourier transform device for performing a Fourier transform on the samples to obtain Fourier coefficients, and a decoder responsive to the Fourier coefficients for recovering the message bits transmitted by the transmitter.

2. The system of claim 1 wherein each of the first and second timing controllers comprises:

a phase locked loop for receiving a synchronous signal from said power line voltage and generating a sine wave which is in phase and frequency with the synchronous signal;

a period measurer coupled to the phase locked loop for estimating the period of the sine wave and producing an estimated period signal;

a phase comparator responsive to: the estimated period signal, the sine wave and an externally supplied phase offset signal, for comparing an estimated phase of the synchronous signal to the externally supplied phase offset and for generating a start signal in response to detected agreement between the estimated phase and the externally supplied phase offset; and a signaling symbol generator which generates a harmonic modulated symbol of duration equal to a period of the synchronous signal and starting at the phase offset.

3. The system of claim 1 wherein each of the first and second timing controllers comprises:

means for producing a synchronous signal from said power line voltage;

a comparator for detecting zero crossings of the synchronous signal;

switching means for providing a square wave output voltage in phase and frequency with the synchronous signal;

means responsive to said switching means for generating timing pulses from said square wave output voltage;

a clock synchronization circuit responsive to the timing pulses for generating reset signals;

means for generating an asynchronous clock signal; and a frequency divider for dividing said asynchronous clock signal to generate an output clock signal, said frequency divider being responsive to said reset signal for synchronizing the output clock signal with the synchronous signal.

4. The system of claim 3 wherein said means for producing a synchronous signal from said power line voltage comprises a transformer coupled to said power line, and a lowpass filter coupling said transformer to said comparator, and wherein said means responsive to said comparator for generating timing pulses from said square wave output voltage comprises a divide-by-two logic divider for producing pulses at half the frequency rate of said square wave output voltage, and logic circuitry coupled to said logic divider for producing said timing pulses with a period smaller than the period of said pulses produced by said divide-by-two logic divider.

* * * * *